US006546384B2

(12) United States Patent
Shaath et al.

(10) Patent No.: US 6,546,384 B2
(45) Date of Patent: Apr. 8, 2003

(54) METHOD OF DETERMINING AND STORING INDEXING DATA ON A SEQUENTIAL DATA STORAGE MEDIUM FOR SUPPORTING RANDOM ACCESS OF DATA FILES STORED ON THE MEDIUM

(75) Inventors: Kamel Shaath, Kanata (CA); Richard Freeman, Ottawa (CA)

(73) Assignee: Kom Networks Inc., Ottawa (CA)

( * ) Notice: Subject to any disclaimer, the term of this patent is extended or adjusted under 35 U.S.C. 154(b) by 0 days.

(21) Appl. No.: 10/067,916

(22) Filed: Feb. 8, 2002

(65) Prior Publication Data

US 2002/0073096 A1 Jun. 13, 2002

Related U.S. Application Data

(62) Division of application No. 09/267,788, filed on Mar. 15, 1999, now Pat. No. 6,349,294.

(30) Foreign Application Priority Data

Jul. 31, 1998 (CA) .............................................. 2244626

(51) Int. Cl.[7] .............................................. G06F 12/08
(52) U.S. Cl. .............................. 707/2; 707/3; 707/100; 711/112; 711/117; 711/122; 711/218
(58) Field of Search .............................. 707/2, 3, 100; 711/112, 117, 122, 218

(56) References Cited

U.S. PATENT DOCUMENTS

| 3,913,074 A | 10/1975 | Homberg et al. |
| 4,571,700 A | 2/1986 | Emry, Jr. et al. |
| 4,633,391 A | 12/1986 | Rundell |
| 4,633,393 A | 12/1986 | Rundell |
| 4,958,314 A | 9/1990 | Imai et al. |
| 4,975,898 A | 12/1990 | Yoshida |
| 5,204,958 A | 4/1993 | Cheng et al. |
| 5,214,627 A | 5/1993 | Nakashima et al. |
| 5,481,694 A | 1/1996 | Chao et al. |
| 5,537,636 A | 7/1996 | Uchida et al. |
| 5,708,650 A | 1/1998 | Nakashima et al. |
| 5,717,683 A | 2/1998 | Yoshimoto et al. |
| 5,737,145 A | 4/1998 | Jung |
| 5,745,890 A | 4/1998 | Burrows |
| 5,825,728 A | 10/1998 | Yoshimoto et al. |
| 5,845,274 A | 12/1998 | Chadha |
| 5,850,566 A | 12/1998 | Solan et al. |
| 6,343,341 B1 * | 1/2002 | Cabrera et al. ............. 711/111 |
| 6,374,232 B1 * | 4/2002 | Dageville et al. ............. 707/2 |

* cited by examiner

*Primary Examiner*—Jean R. Homere
(74) *Attorney, Agent, or Firm*—Venable; Ralph F. Albrecht

(57) ABSTRACT

A format structure for storing retrievable data on a sequential data storage medium, which includes in an exemplary embodiment a start field for indicating the start of a data file, an index field for storing indexing data respecting the data file, and a data field. Stored encoded data on the storage medium can use the last file written on the storage medium to create indexing data that can be stored alongside the data files as they written so that each sequential data storage medium remains fully indexed.

16 Claims, 11 Drawing Sheets

*Figure 3e*

— Add file "t" —

0004 | "k" data | Y | 0 | α | 4 | s | β | 4 | z | a | α | l | k | α | 3 | z | 2 | s | α | 2 | t | α | 4 | "t" data | Blank

— Add file "n" —

0005 | "t" data | Y | 0 | α | 5 | s | β | 4 | z | a | α | l | k | α | 3 | n | α | 5 | "n" data | Blank

— Add file "h" —

0006 | "n" data | Y | 0 | α | 6 | k | β | 6 | s | β | 4 | z | a | α | l | h | α | 6 | z | k | α | 3 | n | α | 5 | "h" data | Blank

— Add file "m" —

0007 | "h" data | Y | 0 | α | 6 | k | α | 7 | s | β | 4 | z | k | α | 3 | m | α | 7 | n | α | 5 | "m" data | Blank

0008 — Add file "p" —

| "m" data | X | o | α | 8 | n | β | 8 | Y | o | α | 6 | k | α | 8 | Y | n | β | 8 | s | β | 4 | z | k | α | 3 | m | α | 7 | z | n | α | 5 | p | α | 8 | "p" data | Blank |

0009 — Add file "y" —

| "p" data | X | o | α | 8 | n | α | 9 | Y | n | β | 8 | s | α | 9 | z | 5 | α | 2 | t | α | 4 | y | α | 9 | "y" data | Blank |

Xα, Yα, Zα

Locating Files

METHOD OF DETERMINING AND STORING INDEXING DATA ON A SEQUENTIAL DATA STORAGE MEDIUM FOR SUPPORTING RANDOM ACCESS OF DATA FILES STORED ON THE MEDIUM

This application is a divisional application of Ser. No. 09/267,788, now U.S. Pat. No. 6,349,294.

FIELD OF THE INVENTION

The present invention relates to a method of indexing data on a sequential data storage medium for storing and locating data files, and a storage medium such as magnetic and optical tape, and the like incorporating the indexing data.

BACKGROUND OF THE INVENTION

The conventional method of storing encoded data files, such as those generated by a computer, on a tape medium is to write a filemark at a point on the tape at which the data file is to be stored, write a label block containing the name of the data file or other data by which the file may be identified, store the label block immediately following the filemark and then write the data immediately following the label block. In some instances, the data file archiving process involves bundling a number of files and storing the bundled files as a single file on the tape. While this process simplifies the process of storing the files on the tape, it complicates the process of retrieving individual files from the tape when required. Frequently, the entire bundle must be retrieved to operating memory of a computer in order to extract a desired file. It would be desirable to be able to retrieve a single file without these complications.

When files are stored individually, the conventional method of retrieving an individual file is to sequentially read the label block of each of the files on the tape until the desired file is located. Once located, the file is retrieved. This process is satisfactory when the number of files is relatively small, such as a few hundred or thousand files. However, the process is extremely slow and tedious when the number of files is in the order of millions. Optical tape capable of storing almost 1,000 GigaBytes of data representing potentially millions of files is now commercially available. A single tape can replace an entire tape library consisting of thousands of tapes and eliminate costly and time-consuming manual loading, unloading and tape maintenance. Clearly, retrieval of these files can be extremely time consuming with conventional file retrieval methods.

Indexing methods for sequential recording media such as magnetic or optical tape frequently involves dedicating a portion of tape for index storage separate from the data storage. Each time a file is added to the tape the tape must be reversed to the index portion to add the new index data and then back to the data storage portion to add the next file. This head movement back and forth through the tape slows the data storage system significantly. Even the above noted methods of scanning a tape for a particular file are highly dependent on tape length and speed of the reader. When a tape requires 90 seconds to travel end to end, a randomly selected file will average 45 seconds to retrieve excluding processing time for processing each file block.

Other indexing methods store index data in memory, such as the computer hard drive. Only when the tape is substantially filled is a complete index written on the tape. It is desired to have index information resident in an operating memory, such as the hard drive, RAM or other memory than the tape, for search functions when files are to be retrieved from a tape. However, for archiving purposes, the index information is not secure while stored in operating memory. A catastrophic failure such as a hard disk crash could result in the loss of all indexing data. Recreating the index is time consuming requiring reading each of the file identifiers on the tape and reassembling the indexing data. For numerous and large tapes, the risk of losing indexing data is undesirable. In addition, archiving processes involve the compilation of numerous tapes simultaneously. Completed tapes may include indices stored on tape. However, the partially completed tapes generally do not. As a result, numerous indices may be stored in memory at once greatly increasing the consequences of a data loss. Changing partially filled tapes also presents similar difficulties, since an index may not be available in the operating memory and must be compiled from the partial tape.

These prior art practices of "guess work" retrieval, or a file indexing system based on magnetic disk techniques are incompatible with archival needs and greatly complicate the handling and distribution of numerous tapes for extensive tape libraries. Conventionally, data stored on tape media is not modified. Modified files are merely written to the end of the tape, further complicating the indexing and retrieval process. That said, some tape media are rewritable. It would be preferable for any indexing method to accommodate both rewriting of data files on rewritable media and replacing files on write once media.

Accordingly, there is a need for a simpler, faster and more efficient method of storing and retrieving files stored on large tapes. In addition it is desired to store cumulative index information on the tape as data is added so that the loss of an index in memory can be quickly and easily restored from index data on the tape, without reading every file.

SUMMARY OF THE INVENTION

The present invention provides a novel tape file formatting structure and a method for storing and retrieving individual files from potentially millions stored on a single tape. In accordance with the present invention, index data is stored on the tape alongside the files as they are written so that each tape remains fully indexed all the time and for all time. All tapes are self-contained and do not require additional magnetic disk storage. Even with several million files on a tape, a single file can be quickly and easily retrieved. The present invention may be supplied as an easy to use application program which allows the user to write files to tape, read them back, and perform many other functions or as a subroutine package which allows the user to incorporate the present invention into the user's own software.

One aspect of the present invention provides a method of retrievably storing indexed data on a sequential data storage medium, the data indexed according to a predetermined order, comprising the steps of:

storing a data file on the sequential storage medium;

identifying the presence of a last written index portion including reference to locations of other previous index portions;

determining an index position for index data relating to the data file within the identified last written index portion according to the predetermined order;

for any of the identified previous index portions, determining if the addition of the index data relating to the data file results in a change to any of the index portions or if the index portions are unchanged;

storing an index on the sequential storage medium including:

references to the location of any index portions that are determined to remain unchanged; and index portions that are changed to include the index data relating to the data file according to the predetermined order.

A further method of retrievably storing encoded data files on a sequential storage medium, in accordance with the present invention comprises the steps of:

a) locating a last file stored on the medium;

b) duplicating first indexing data of the last file stored on the medium;

c) compiling second indexing data for a new data file having a primary key and a start position of the new file on the medium;

d) modifying the duplicate of the first indexing data to include the second indexing data of the new data file;

e) inserting the modified duplicate of the indexing data in the new data file; and f) storing the new data file sequentially on the medium following the last file stored.

A still further preferred method, in accordance with the present invention, comprises a method for locating a data file stored on a sequential recording medium having a specific entry key, absent an index for the data file stored in operating memory said method comprising steps of:

(a) locating a last file written on the medium;

(b) reading an indexing data field of the last file, said indexing data field having at least one block ordered in a hierarchy of block levels;

(c) extracting a lowest level block and finding an indication of an immediately higher level block having information relating to the data file by comparison of the specific entry key of the data file with information contained in the lowest level block;

(d) moving to a position on the medium of a file having the immediately higher level block;

(e) extracting from the immediately higher level block an indication of a further immediately higher level block having information relating to the data file by comparison the specific entry key of the data file with information contained in the immediately higher level block;

(f) repeating the steps (d) and (e) until a final leaf level block is extracted;

(g) moving to a file position having the data file indicated by information contained in the final leaf level block Another aspect of the present invention provides a sequential recording medium for retrievably storing a plurality of files, each file comprising:

a start field for marking the start of a file;

an index field for storing indexing data respecting the associated file, and for storing a sequence of one or more positions of other start fields respecting other files leading in a reverse direction on from a current position on the medium toward the beginning of said medium; and, a data field for storage data which forms said data file, wherein the index field identifies an ordered range of files stored on the medium, and locations of previous index files on the medium containing additional portions of the ordered range.

A further aspect of the present invention provides an apparatus for retrieving a data file stored on a sequential recording medium, absent an index for the data file stored in operating memory, the apparatus comprising:

a data reader for reading data from a current location on the storage medium;

a mechanism for varying the current location;

a processor for controlling the mechanism and the data reader and for receiving data from the data reader, the processor comprising:

means for locating a current index field adjacent a current data file stored on the medium and for controlling the data reader to read the current index field and provide the read data to the processor, means for traversing a tree branch determined from the provided current index field, the tree branch having at least an additional index field forming a leaf level storing a location of the file on the storage medium, the additional index field stored at another location on the storage medium adjacent another data file, and means for controlling the mechanism to move the storage medium to the location of the file and for controlling the data reader to retrieve the file therefrom.

Advantageously the present invention permits indexing data to be stored on a sequential recording medium quickly and efficiently, while providing a method for rapidly locating files or constructing an index in the absence of an index stored in operating memory.

BRIEF DESCRIPTION OF THE DRAWINGS

These and other features of the invention will become more apparent from the following description by way of example only, in which reference is made to the appended drawings wherein:

FIGS. 3a to 3j is a sequence of views illustrating the index fields of a sequence of data files on tape according the method of the preferred embodiment of the present invention;

DETAILED DESCRIPTION OF THE INVENTION

Figure 1:
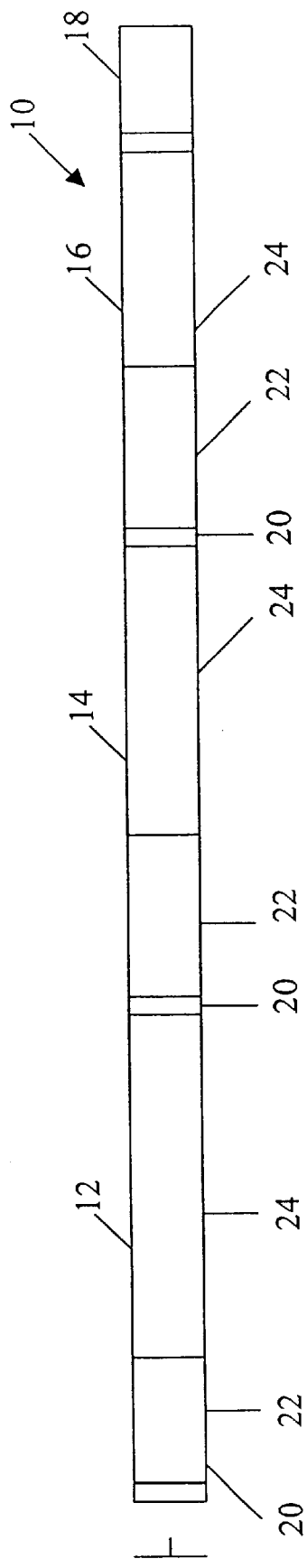
FIG. 1 is a graphical representation of a portion of the length of tape showing three sequentially stored files according to a preferred embodiment of the present invention.

In accordance with the present invention, index information, comprising the range of files and their location on the tape, is compiled and written to the tape with each new entry. This may be accomplished by a number of systems. The index can be compiled and written completely between each file. However, this is not ideal as it represents costs in both time and storage space. Alternatively, index information may be incremental for a given volume of data or number of entries. Fully compiled indices would then be rewritten only every 1000 files, for example. A preferred embodiment provides a balance of speed, space efficiency and reliability. This comprises writing incremental index portions following each new entry. A progressive index orders the new file entry and address, writes the amended portion of the index and provides the locations of the remaining unchanged index portions previously stored. Thus index portions are quickly located on the tape and compiled to assemble a complete index. Preferably, when a tape is filled a complete master index is stored at the end of the tape.

The following description and the drawings relate to the preferred embodiment in which the medium is optical tape. However, it will be understood by those skilled in the art that the present invention can be employed with most kinds of sequential recording and data storage medium, including but not limited to magnetic tape and write-once optical tape. Tape drive apparatus are well known in the art. They are provided with a mechanism for receiving a tape, writing data to the tape and reading data from the tape. To communicate with a computer system, an interface card is installed into the computer and a cable is connected between the tape apparatus and the computer. A computer program invoked in the computer operates to provide instructions and data to the tape apparatus via the interface card and connecting cable.

Generally, there are two types of tape apparatus. More sophisticated apparatus are capable of moving the tape to a specific position while others move between positions by counting filemarks written to the tape. The present invention can be used with both of these techniques and, indeed, it will be understood as the description proceeds that the present invention is not limited by the mode of operation of the tape apparatus. The present invention provides a data file formatting structure and method of storing and retrieving encoded data files on recording medium. The terms "file" or "data file" used herein refers to any computer generated file, including program files, text files, system files and the like and any formatting data associated with such files which may be embedded by the operating system and application programs under which the data file was generated.

By way of overview, the present invention stores files on the recording medium continuously in sequential order. This means that a new file is added to the medium at the end of the last file added to the medium or, stated differently, at the beginning of the blank portion of the medium. This provides most efficient use of the storage medium. File marks may also be provided at defined locations using a tape formatted into uniform increments when appropriate for the system used.

FIG. 1 illustrates a continuous file storage arrangement wherein reference numeral 10 refers to the tape medium, reference numerals 12, 14, and 16 refer to three data files stored on the medium and numeral 18 refers to the blank portion of the medium at the end of the last file, file 16. Each file includes three components, namely, a filemark 20 which is a code recognized by the tape reading apparatus (not shown) as the beginning of a data file, an index field 22 discussed in detail below, and the content 24 of the file itself. These three components are stored in this sequential order. The indexing data may be stored at the file mark for easy identification, or following the data thereby identified by a filemark preceding a next file. Advantageously, with index data following the data, the index portion is always the last data written to the file and little tape motion is necessary in order to locate and use the index data.

The index field of a new file is compiled by the preferred method described below before the file is saved on the medium. The index field contains sufficient information to locate any file on the medium. More specifically, the index field stores key positions of additional index fields on the tape thus providing information to locate any data file on the tape between a current position and a target position moving one direction only. Preferably the index is constructed to compound index data in one direction only, so that reading the data in reverse direction it is usually not necessary to scan all the index files on the tape. In the preferred embodiment, the read direction is from the end of the medium toward the beginning of the medium. A preferred indexing hierarchy is discussed in detail below. Of course, numerous other indexing schemes can be used to provide the advantage of cumulative indexing data stored with the addition of each data file on a sequential storage medium.

Under usual circumstances an index for a tape loaded in the system will be stored in operating memory such as the hard disk. To locate a file, a search of the index in operating memory determines the location of the file. The tape is advanced to the file position and the file is read. However, if a hard disk crash occurs, or other catastrophic event results in the loss of the stored index, the retrieval of a desired file is accomplished by searching the records on the tape. This may also be necessary when a partially written tape which does not contain a compiled master index, is installed into an archive system.

In accordance with the present invention, to locate a file on the medium, when no index is stored in the operating memory, the system locates the last file added to the medium and reads its indexing data. The index data is stored in a predetermined order, such as alphabetical or numerical regardless of the file position on the medium, in blocks of a predetermined number of entries. Once the block containing a range of index data including the target to be located is determined, the appropriate one of possibly several positions on the medium is accessed. These positions are in fact the filemarks of other files on the medium, where the index includes the address of the desired target file, or additional index blocks are located. If the position accessed is a final leaf level, the target data address has been located. If the additional index segment including the target indicates a further position, the system advances to that position and repeats the process until a final leaf level entry for the desired file is either located giving the file address or the file is determined not to be present.

The index field of a data file is comprised of one or more leaf level blocks of indexing data and, if there is more than one leaf level block, at least one root level block of indexing data. A leaf level index block is an index block which stores the actual addresses of data files and, in a multiple level index field, is considered to be at the highest level in the field. A root level block is the lowest level block in the index field. In a single block index field, the block will be both a leaf level and a root level block. There may also be intermediate or subsidiary level blocks between leaf level blocks and root level blocks. These index blocks store the address of their respective next higher level or parent blocks. Each index field contains at least one block of each level in existence between the current position and the beginning of the medium.

Figure 2:
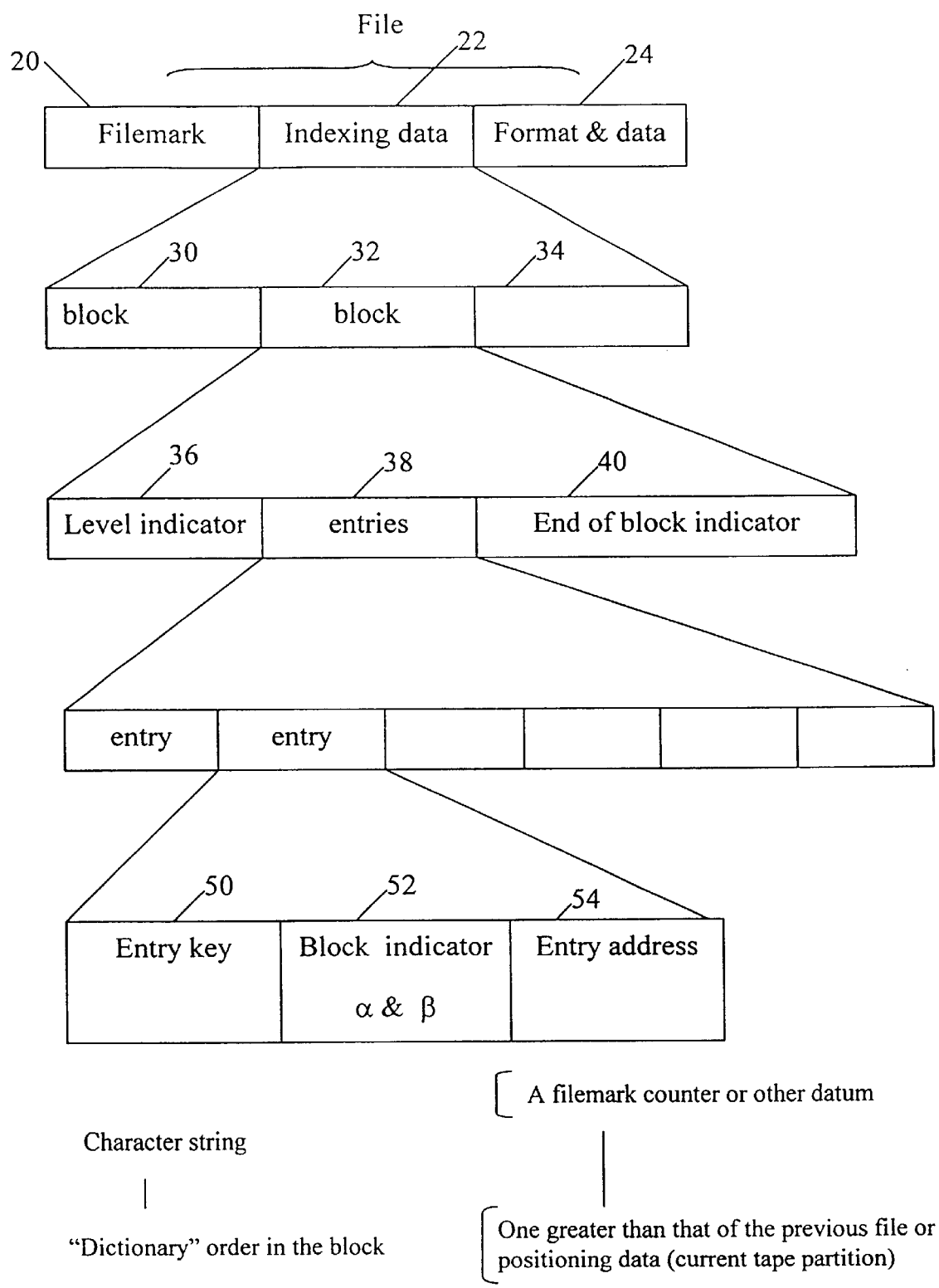
FIG. 2 is graphical representation of the formatting structure of a data file according to the preferred embodiment of the present invention.

FIG. 2 illustrates an index field having three blocks, including two final leaf level blocks 30 and 32 and a single root level block 34. Each block of indexing data includes a level indicator 36, at least one entry 38 and an end of block indicator 40. As mentioned in greater detail below, the entries specify the address of either a data file if the entry is located in a final leaf block or the address of an index block if it is located in the subsidiary block.

The length in bytes of a block, and therefore, the number of entries in a block, may be any desired value; however, once it has been selected, it remains fixed. By way of example the length of a block may be 1536 bytes, and if the average length of an entry is 50 bytes, then there would be about 30 entries per block. When the length of a block has reached the predetermined value, the block is split into two blocks of the same level, the first block being designated and the second block being designated and a next lower level block is created with two entries. The first half of the entries in the original block remain in that block while the second half of the entries are moved into the second block. The first entry of the lower level designates the lowest possible key value while the second entry designates the first entry of the second block. Alternatively, the block length does not remain fixed and an algorithm is used to determine when a leaf is to be split into two leaves.

In the example described below, the maximum length of a block is arbitrarily set to the value corresponding to four entries. In that example, different levels are represented by uppercase letters of the latter part of the alphabet with the final leaf level being Z and lower levels in decreasing order and beginning with Y. The lowest level is a root level. Different blocks at the same level are represented by the subscripts and . It will be seen that the number of levels in an area slowly increases as the tape fills up but level indicators remain the same except for that of the root level. For example, if the final leaf level indicator is represented by the character Z, then the level indicators of the blocks in a given area might be X, Y and Z. Further down the tape, the level indicators might be W, X, Y, Z or V, W, X, Y, Z.

An entry is comprised of three parts including a character string 50 called the "entry key", a "block indicator" 52 which can take on one of two values ( and ,) and a filemark counter 54 or other datum, called the "entry address", used to position the tape head to a specific location on the tape. The "End of Block Indicator" indicates the end of a particular block. Typically, the entry key will be the name of the data file. The block indicator refers to one of the blocks in the next higher level. For example, if an entry is in a level Y, then a block indicator of in the entry refers to the second block in the next higher level, level Z. The entry address refers to the position on the tape at which the next higher block level will be located.

Figure 3A:
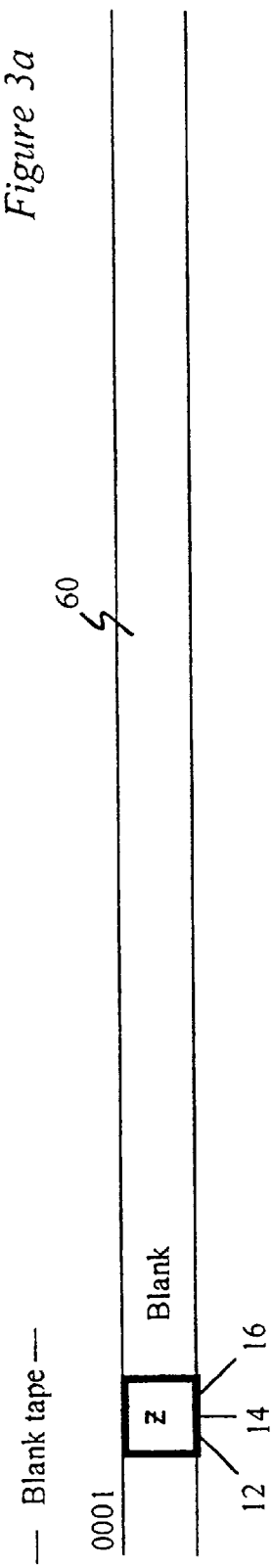

A new tape is prepared for use by writing, at the start of blank medium, a filemark and a single index block coded as final leaf level having no entries. A partially written tape may be prepared in the same manner in which case previously written data will be ignored. FIG. 3a graphically illustrates a newly formatted tape 60 having a filemark 12, a level indicator 14 and an end of block indicator 16. Thus, after preparation, the tape contains an empty, single level, index field labelled Z.

Adding Files

Figure 4:
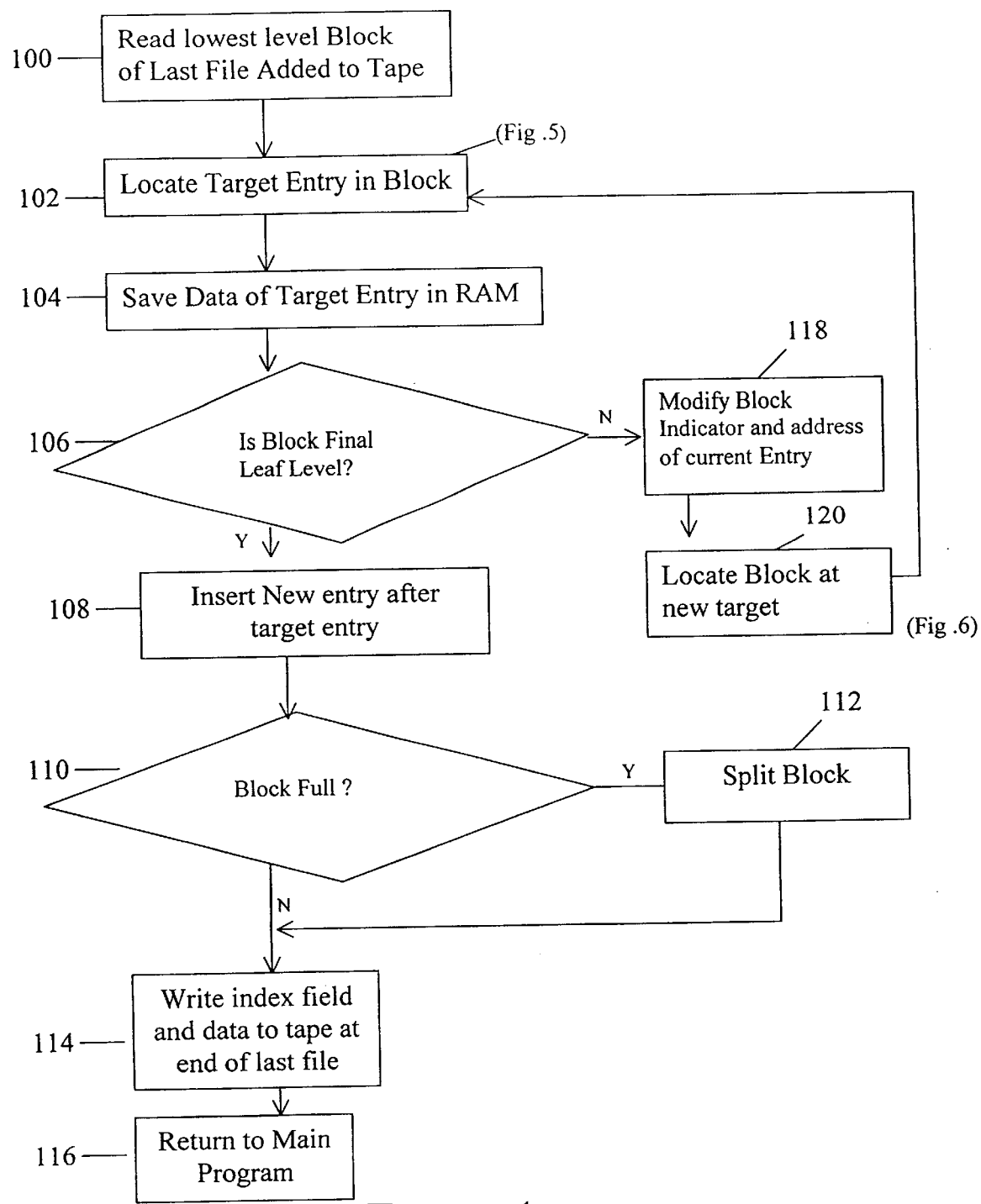
FIG. 4 is a flow chart illustrating the major steps of creating the index field of a data file prior to writing the file to the end of the tape according to a preferred embodiment of the present invention.

FIG. 4 is a flow chart illustrating the fundamental steps of the method for adding new files to the tape. This description is based on an optical tape apparatus whose mode of operation is to search for specific filemarks placed on the tape. The fundamental features will be described first and this will be followed with a specific example.

As indicated by box 100, the first step in a write operation is to read the lowest level block in the index field of the last file written to tape. This is followed by locating a target entry in that block, as indicated by box 102. Generally speaking, the target entry is that entry whose entry key or index key immediately precedes the first entry whose index key is greater than the index key of a new file (or of a file of interest). The next step, indicated by box 104 is to save the data, particularly, the block indicator and entry address, of the located target entry. This data may be required to locate target entries in the next higher level or to retrieve a data file. At this point, it is necessary to decide whether the current block is a final leaf level block or a lower level. This step is indicated by decision box 106. If the block is a final leaf level block, a new entry is added immediately following the located target entry (box 108). Then, if the block has become full, as indicated by decision box 110, a block split operation (box 112) is performed. The compiled index data and the content of the file are then written to the tape (box 114) and program control returns to the main program. If, at box 106, the block located is not a final leaf level block, then, as indicated by box 118, the saved block indicator and entry address of the located target entry are modified and the block previously specified by the target entry is then located, as specified by box 120, and program control is returned to box 102. The process specified by boxes 102, 104, 106, 118 and 120 continues until a final leaf level block is located.

Figure 5:
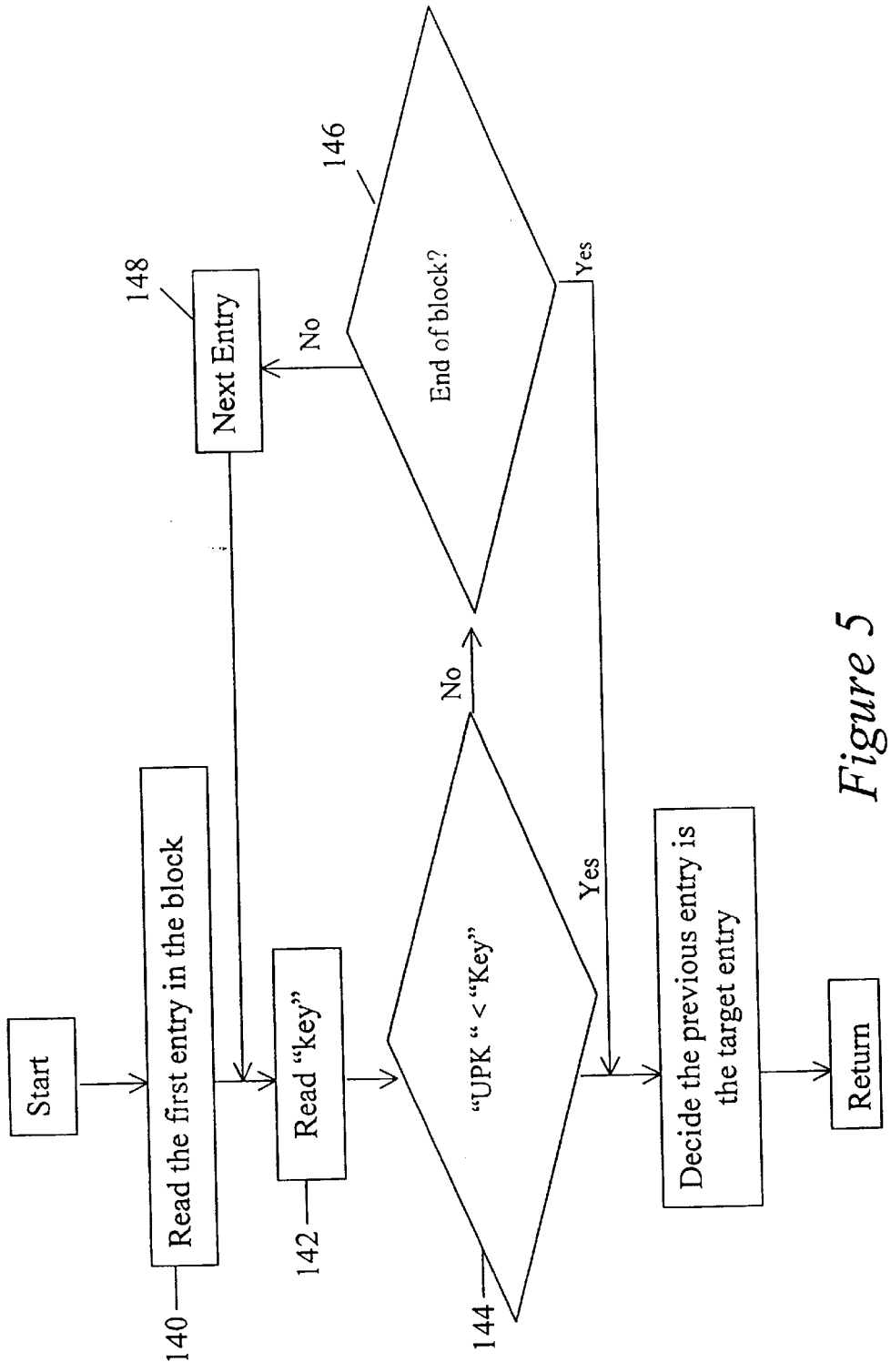
FIG. 5 is a flow chart illustrating the method of locating a target entry in an index block according to a preferred embodiment of the present invention.

Reference will now be made to FIG. 5. The step represented by box 100 in FIG. 4 involves the step of positioning the tape to the start of the blank portion of the tape, positioning in reverse one filemark, stepping forward over the filemark located and reading the index field for the file, which will be, at this point, the last file stored to the tape.

The process represented by 102 in FIG. 4, i.e. of locating a target entry in the block, simply involves comparing, in turn, the index key of each entry in the located block against the user's primary key (UPK), which will become the entry key of the file to be saved to tape, until either the entry key is greater than the UPK or the end of block indicator is located. In either case, the previous entry is the target entry. The process is illustrated in FIG. 5 and includes reading the first entry in the block (box 140), reading the entry key in the block (box 142), and determining whether the user's primary key (UPK) (box 144) is less than the entry key of the entry. If this condition is not satisfied and the end of the block has not been reached (box 146), the next entry is read (box 148), and steps 142 and 144 are repeated. If the condition at box 144 is satisfied or if the end of block marker is detected at 146, the entry which just precedes the current entry or the end of block marker is determined to be the target entry. If there are no entries in the block, i.e. if the tape is blank, than a new entry containing the UPK as the entry key, a as the block indicator and an initial filemark of 0001 can be immediately inserted into the block. If there is an entry, the data of the target entry is saved in RAM for future reference.

Figure 6:
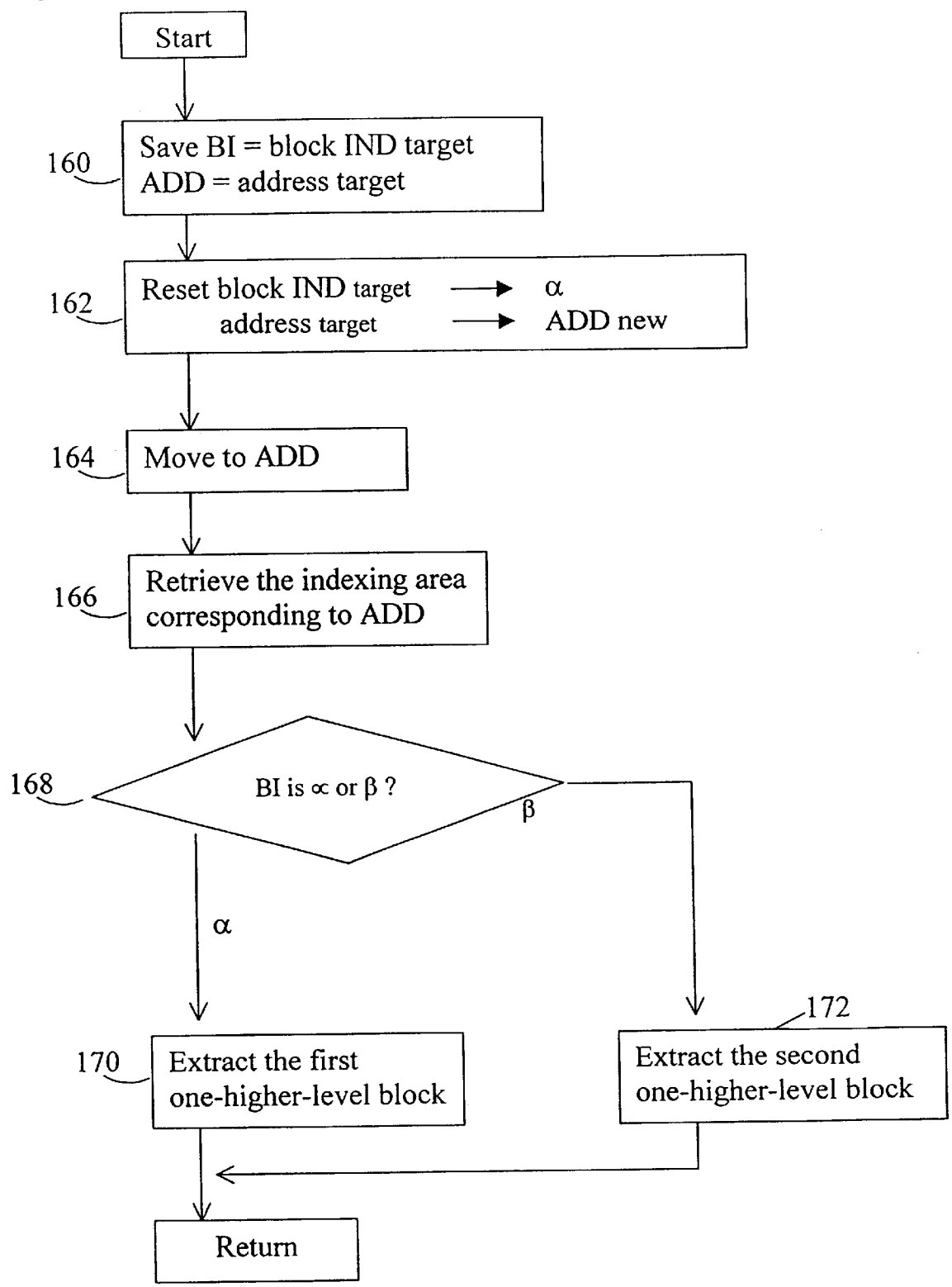
FIG. 6 is a flow chart illustrating part of the process of creating a subsidiary level block in a multilevel index structure for a new data file to be added to the tape.

Step 104 in FIG. 4 involves saving the block indicator and the entry address of the located target entry to the operating memory. In step 106, the block level field of the block containing the located target entry is checked to determine whether the block is a final leaf level block, i.e. whether it is a "Z" block Steps 118 and 120 are expanded in FIG. 6. As indicated above, this step modifies the block indicator and entry address of the located target entry in a subsidiary level. Before modifying these fields, the current block indicator and the target address of the located target entry are stored in memory (box 160) for use in locating the next target entry. The block indicator is then changed to and the entry address is changed to the address of the new file to be added to the tape as indicated at box 162. The next step of locating the block at the new target (box 120 in FIG. 4) involves moving the tape to the entry address which was saved as the new target address in step 160 and then reading the index field at that position (box 166). The block at the next higher level corresponding to the block indicator saved to memory at step 160 is then read as indicated by decision box 168 and boxes 170 and 172. The process then returns to step 102 and the process continues until a final leaf level block is located.

Figure 7:
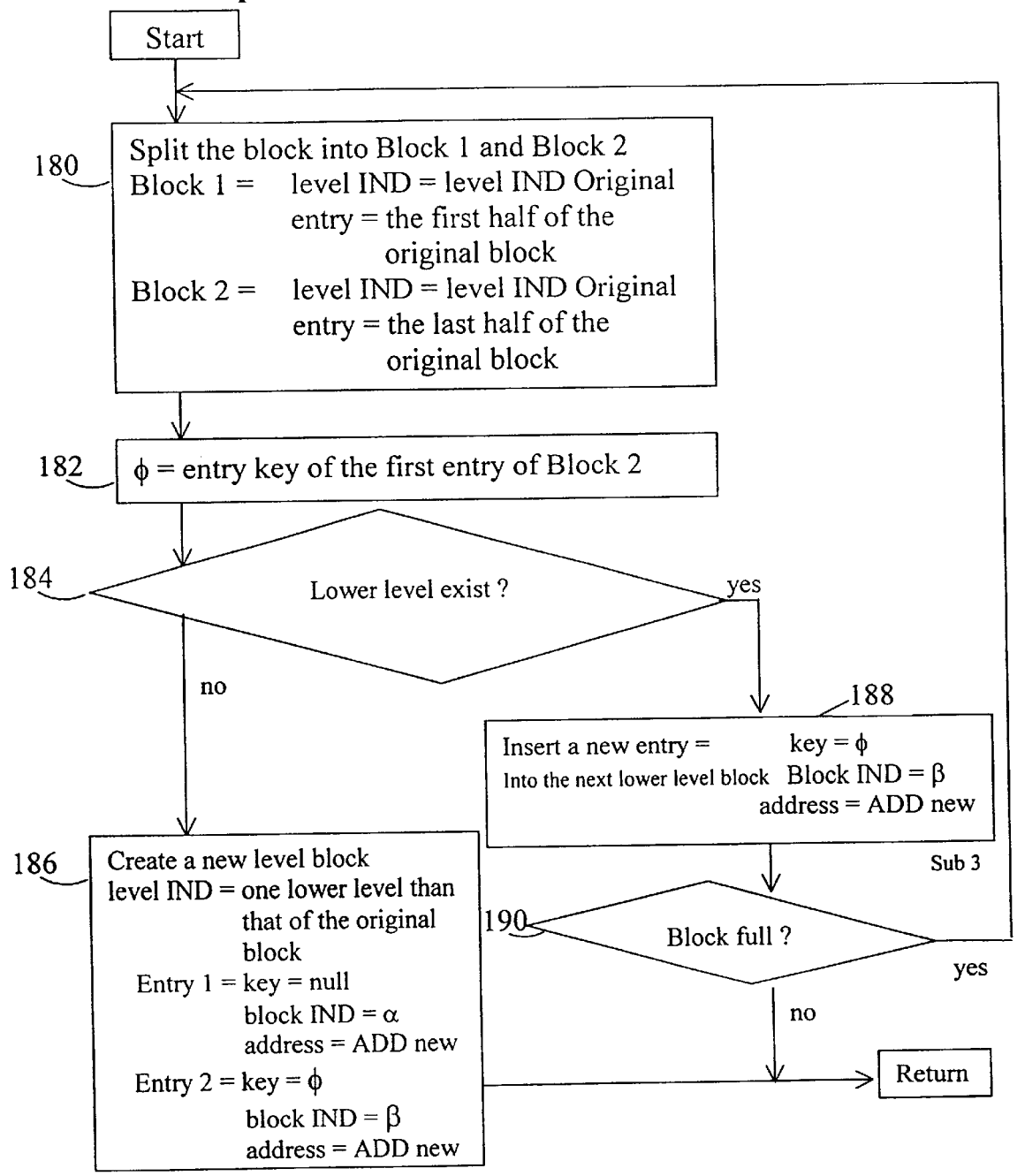
FIG. 7 is a flow chart illustrating the process of splitting an index block when number of entries in the block has reached a predetermined number.

The block split operation at step 112 of FIG. 4 is illustrated in FIG. 7. This step is invoked when a block, final leaf level or lower level, has been filled. In principle, this step involves moving the last half of the entries in the block into a new block having the same level and either adding a new entry to an existing next lower level block, if such exists, to refer to this block or creating a new next lower level block with two entries, one referring to the original block and the other referring to the new block. Thus, referring to FIG. 7, step 180 involves, without dividing any of the entries, removing the last half of the entries from the original block and putting them into their own block. The entry key of the first entry of this new block is saved to memory and will be referred to herein as as indicated at step 182. All of the entries in both blocks retain their original entry keys, block indicators and entry addresses, bearing in mind that the latter two fields refer to blocks and addresses of blocks at the next higher level or, if final leaf block entries, the actual entry address of data files.

Step 184 involves checking the index field currently in memory to determine whether there exists a lower level block. If there does not exist a lower level block, then, as indicated at step 186, a new block, one level below the current level is created and two entries are placed into that block. Thus, if the current level is represented by final leaf level Z, then the level of the new block will be Y. The entry key of the first entry will be a null character indicating the lowest possible entry key value, the block indicator will be and the entry address will be the current address. The entry key of the second entry will be , the entry key of the first entry of the new block added at the previous level, the block indicator will be and the entry address will be the current address. The current address referred to above is the starting address of the new file to be added to the tape. Program control then returns to the calling program.

On the other hand, if there already exists a lower level block, then, as indicated at step 188, a new entry is added to that block to refer to the first entry in the new block created at the previous level and thus it will include the entry key, , block designator to refer to the second block at the next higher level and the address of the current position. Decision step 190 determines whether the addition of this entry fills the block. If it does, the block must be split and, accordingly, program control is redirected to step 180. Otherwise, control returns to the calling program.

Locating Files

Figure 8:
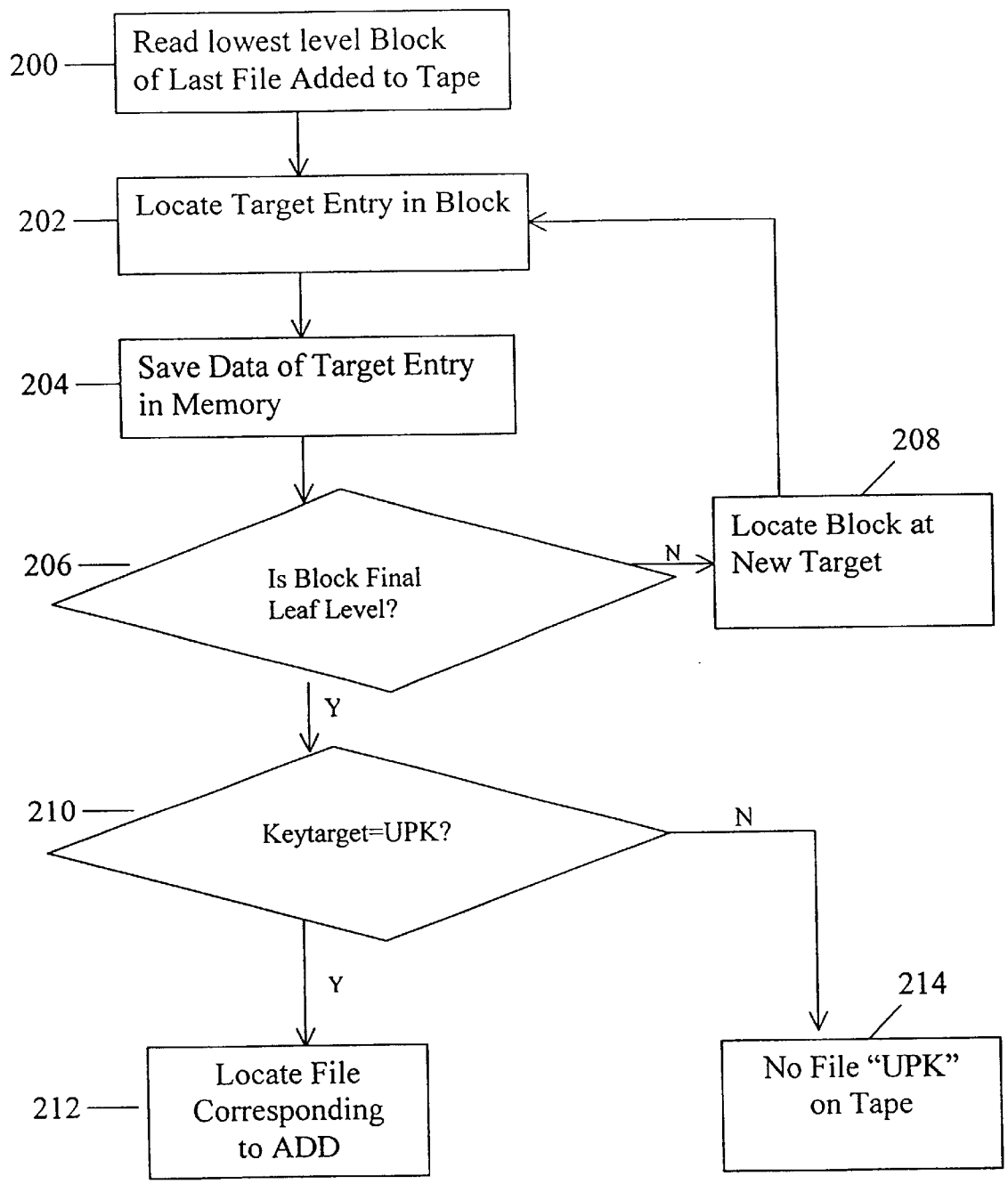
FIG. 8 is a flow chart illustrating the process of locating a data file according to a preferred embodiment of the present invention.

FIG. 8 is a flow chart illustrating the process of locating a data file without a stored index. As indicated by box 200, the first step is reading the lowest level block in the index field of the last file written to tape. This is followed by locating a target entry in that block, as indicated by box 202. The next step, indicated by box 204 is to save to memory the data, specifically the block indicator and entry address, of the located target entry. At this point, it is necessary to decide whether the current block is a final leaf level block or a subsidiary level, as indicated by box 206. If the block is not a final leaf level block, the next higher block specified by the target entry is located, as indicated by box 208. The step of locating of the next higher block is performed in the same way as was described in connection with FIG. 6, but the resetting process is not required. Then, program control is returned to box 202. The process specified by boxes 202, 204, 206 and 208 will continue until a final leaf level block is located.

At box 206, when the block is a final leaf level, then the entry key of the target entry is compared with the entry key of the desired file (box 210). If two entry keys match, the tape is moved to the tape position specified by the entry address of the target entry (box 212) and the desired file can be retrieved. If none of the entry keys match the primary key of the desired file, then it is determined that the desired file is not present on the tape (box 214).

Figure 9:
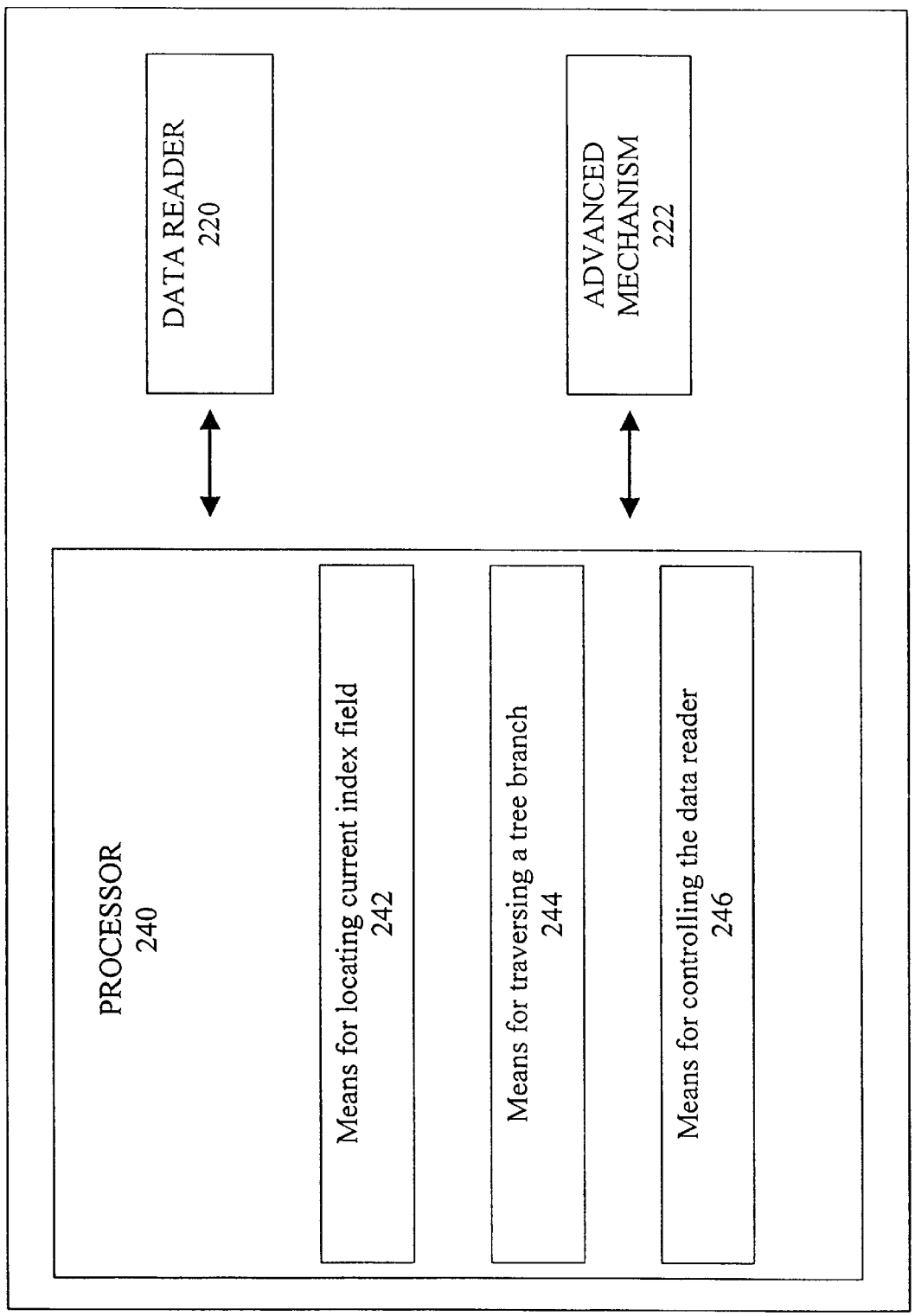
FIG. 9 is a block diagram illustrating an apparatus in accordance with the present invention, for retrieving a data file stored on a tape, absent an index for the tape stored in operating memory.

An apparatus for retrieving a data file stored on a tape, absent an index for the tape stored in operating memory, is shown diagrammatically in FIG. 9. The apparatus includes a data reader 220 for reading data from a current location on the tape, an advance mechanism 222 for varying the current location of the reader on the tape, a processor 240 for controlling the mechanism and the data reader and for receiving data from the data reader. The reader 220 and advance mechanism are known in the art and vary from one tape read device to another. These are not shown in detail. The processor comprises means for locating a current index field adjacent a current data file stored on the medium and for controlling the data reader to read the current index field and provide the read data to the processor 242, means for traversing a tree branch determined from the provided current index field 244. The tree branch, stored in accordance with the present invention, has at least an additional index field forming a leaf level storing a location of the file on the tape, stored at another location on the tape adjacent another data file, and means for controlling the mechanism to move the storage medium to the location of the file and for controlling the data reader to retrieve the file 246. The processor 240 is preferably a program in software, although special purpose hardware can also be used. The means for traversing a tree branch 244 comprises means for reading successive index portions and determining from each successive index portion either a next index portion location or the location of the file.

Deleting Files

A file may be deleted from the indexing structure by following the procedure for adding a file except that, at a final leaf level (level Z), the entry for the file to be deleted is removed instead of added, namely at box 108 in FIG. 4 the entry for the file to be deleted is removed. If the block becomes empty as a result, the target entry at the previous level must be removed also. Only the lowest level indexing block is allowed to remain empty. If the indexing data so formed is written to the tape following a filemark when the file is deleted.

Renaming Files

A file may be given a second primary key value by locating its actual tape location and then proceeding as if a file with the new key were to be added to the tape. When making the entry at a final leaf level, namely level Z, the actual tape location of the file is used instead of the current tape location at box 108 in FIG. 4. At all other levels the current location is used. A file may be renamed by giving it a second name as described above, then deleting the old name as described above.

EXAMPLE

An example of process for adding nine data files having entry keys "a", "s", "k", "t", "n", "h", "m", "p" and "y" to the tape medium in this sequence is described below with reference to FIGS. 3a to 3j. In this example, the maximum block size is corresponding to three entry fields and, thus, a block is split into two blocks when the number of entries reaches four.

FIG. 3a illustrates a formatted tape without entries. A filemark and a single index block have been written at the start position at which a new data file will be added, i.e. at tape position 0001. The single index block is coded as final leaf level, namely level Z, and has no entries. Following the filemark is a level indicator of "Z" and an end of block indicator. A partially written tape may be used in which case any previously written data will be ignored and overwritten.

Figure 3B:
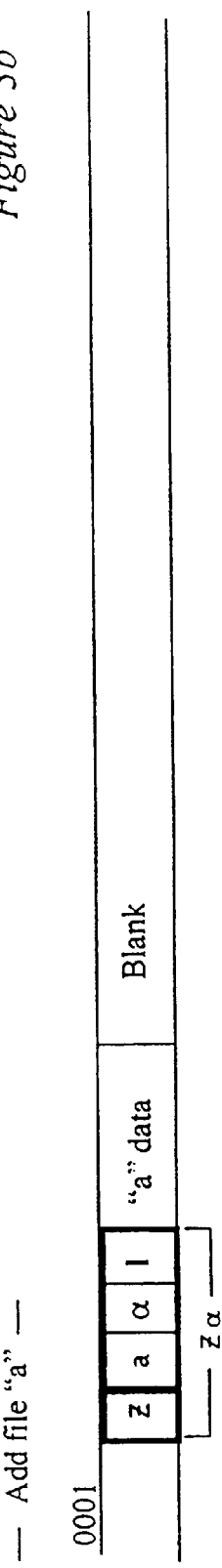

FIG. 3b illustrates the portion of a tape containing the index field of the first file, having a UPK of "a", added to the tape at tape position 0001. Prior to writing this index field to the tape, the existing, empty Z level block was located and retrieved into memory. A new entry having entry key "a", block indicator and entry address 0001 was inserted into the entry field of the Z level block. The revised index block was then written to the tape immediately following filemark 0001 and then the data for file "a" data was written to tape immediately following the end of block marker of the index field.

Figure 3C:
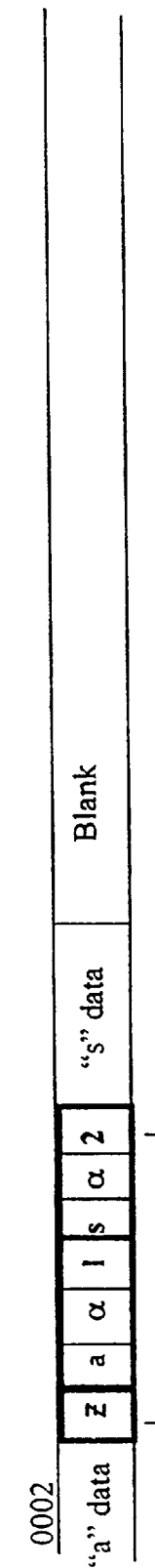

FIG. 3c illustrates the portion of a tape containing the index field of the file, having a UPK of "s" added to the tape at tape position 0002 immediately following the data for file "a". The first step in this process was to locate the last file, file "a", on the tape, read the index field for that file into memory and read the lowest level block in the index field. This block was the single level, single entry Z block. Next, the target entry was located by comparing the index key, "s", of the new file against the entry key of each entry until an entry key was found that was greater than the entry key of the new file or until an end of block indicator was detected. Thus, since "s" is greater than "a", the first record did not satisfy this requirement and, therefore, the next entry was checked. Since the block had only one entry, the system encountered the end of block marker. Thus, the target entry became the first entry, the only entry in this case. A new entry having entry key "s", block indicator " " and entry address 0002 was inserted into the block, immediately following the first entry. It will be noted that this process inherently maintains the entries in sorted order. Thus, the result was a single level Z block, Z, with the two entries shown in FIG. 3c. The tape was then moved to tape position 0002, and a filemark, the index field just formed, and the data of file "s" were written to tape in this order.

Figure 3D:
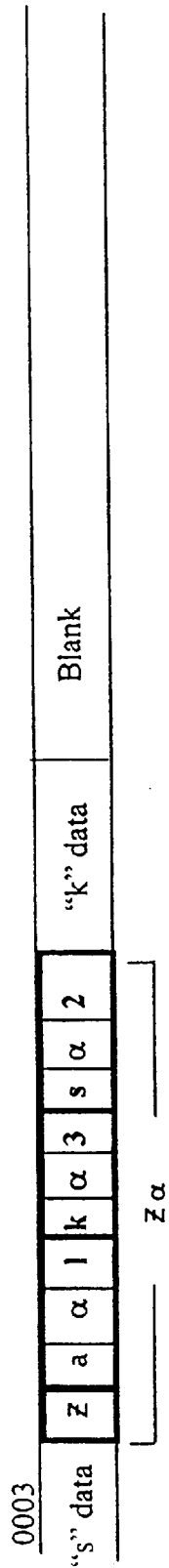

FIG. 3d illustrates the portion of a tape containing the index field of a file having a UPK of "k" added to the tape at tape position 0003 immediately following the data for file "s". As before, the first step was to read the lowest level block in the index field of the last file stored on the tape into memory, read the lowest level block, locate the target entry in that block, and insert a new entry immediately following the target entry and then, if a block split operation is not required, write the filemark, index field and data to the tape. The target entry in this case yielded the first entry, the entry for file "a" in the two entry, single level Z level block. A new entry having entry key "k", block indicator " " and entry address 0003 was inserted into the block after the target entry and before the entry for file "s". The index field in memory for the new file thus had a Z level, three entries, one for each of files "a", "k" and "s", each having a block designator of a, with respective entry addresses of 0001, 0003, and 0002. A filemark, this index field and the data for file "k" were written to tape at the end of the data for file "s".

FIG. 3e illustrates the portion of a tape containing the index field of a file having a UPK of "t" added to the tape at tape position 0004 immediately following the data for file "k". The index field for this new file was created in the same manner as described above with respect to the first three files. However in this case, the size of the resulting index field as created in memory had four entries and was greater than that which is capable of being stored in the index field. Accordingly, a block split operation was performed. First, the Z level block was split into two Z level blocks, designated Z and Z for the purposes of this description according to the procedure outlined in FIG. 7. The first half entries, namely the entries for the files "a" and "k", of the original Z level block remained in the Z block and the last half entries, namely the entries for files "s" and "t", were moved into the Z block. Then, a Y level block, Y having two entries was created. The first entry of the Y block contained the entry key of the lowest possible key value, namely, "0", block indicator " " and the entry address of the tape position for file "t", namely 0004, and the second entry contained the entry key of in the first entry of the Z block, namely "s", block indicator " " and entry address 0004. Thus, one Y level block Y and two Z level blocks Z and Z constitute the index field for file "t". A filemark, followed by the just described index field, and the data for file "t" were written to the tape starting at position 0004.

FIG. 3f illustrates the portion of a tape containing the index field of a file having a UPK of "n" added to the tape at tape position 0005 immediately following the data for file "t". The index field of file "t" contains two Z level blocks and one Y level block. Thus, in creating the index field for file "n", the lowest level block, namely the Y, level block, was read into memory and the target entry, the entry having entry key "0", in that block was located. Since this was not a final leaf level block, the procedure outlined in FIG. 6 was used. Thus, its block indicator " " and entry address 0004 were saved in memory as "BI" and "ADD", respectively. Then, the block indicator and the entry address of the target entry were respectively reset to " " and the tape position for file "n", namely 0005, so as to form a Y level block, Y for file "n". Next, the tape was moved to the position indicated by "ADD" and the next higher level block indicated by "BI" in this case the Z block of tape position 0004, was extracted. Since this was the final leaf level, a new entry having entry key "n", block indicator " " and entry address 0005 was inserted into the extracted Z block after the target entry, the entry for file "k", so as to form a Z level block Z for file "n". Thus, one Y level block Y and one Z level block Z for file "n" was formed. The tape was then moved to tape position 0005, a filemark, the two level index field and the data for file "n" data were written to the tape.

FIG. 3g illustrates the portion of tape containing the index field of a file having a UPK of "h" at tape position 0006 immediately following the data for file "n". To create this index field, the lowest level block of the last file written to the tape was retrieved to memory and the target entry in that block located. Thus, the Y level block of file "n" was read and the target entry was determined to be the entry having entry key "0". The block indicator " " and entry address 0005 of the target entry were saved to memory as "BI" and "ADD", respectively. The block indicator and the entry address of the target entry were then reset to " " and 0006 respectively, so as to form a Y level block, Y, for new file "h". Next, the tape was moved to the position indicated by "ADD" (0005) and the Z level block indicated by "BI", in this case the Z block at tape position 0005, was extracted. Since this was the final leaf level, a new entry having entry key "h", block indicator " " and entry address 0006 was inserted into the extracted Z block after the target entry having entry key "a", so as to form a Z level block for file "h". This resulted in a Z level block having four entries and, therefore, it was necessary to perform a block split operation.

To do so, the Z level block was split into two Z level blocks, Z and Z. The first two entries of the original Z level block remained in the first block, the Z block, and the last two entries of the original Z level block were moved into the Z block. Next since the Y level, Y, had already been formed, it was necessary to insert in that block an entry containing the entry for the first entry of the Z block, i.e. an entry having entry key "k", block indicator " " and entry address 0006 to the Y block after the target entry having entry key "0". Thus, one Y level block, Y, and two Z level blocks Z and Z, were created for file "h". Then, the tape was moved to tape position 0006, and a filemark, the two level indexing field just created and the data for "h" data were written to the tape at that position.

FIG. 3h illustrates the portion of a tape containing the index field of a file having a UPK of "m" added to the tape at tape position 0007 immediately following the data for file "h". When this index field was created, the lowest level block of file "h" was first retrieved to memory and the target entry having entry key "k" was located. The block indicator " " and entry address 0006 of the target entry were saved to memory as "BI" and "ADD", respectively. Then, the block indicator and the entry address of the target entry were reset to " " and 0007, respectively, so as to form a Y level block, Y for file "m". Next, the tape was moved to the position indicated by "ADD" (0006) and the next higher block, the second block Z, indicated by "BI" ( ) at tape position 0006, was read. Since this was a final leaf level block, a new entry having entry key "m", block indicator " " and entry address 0007 was inserted into the extracted Z block after the target entry. The target entry in this case was the entry with entry key "k". This formed a Z level block, Z, for file "m". Thus, one Y level block Y and one Z level block Z, both with three entries, for file "m" were formed and written to tape.

FIG. 3i illustrates the portion of a tape containing the index field of a file having a UPK of "p" added to the tape at tape position 0008 immediately following the data for file "m". As indicated above, both blocks of the index field of file "m", which were used to form an index field for file "p", were full and, therefore, two block split operations had to be performed, one at level Y and one at level Z and a third level block X had to be created. This was achieved as described below.

First, the Y level block from the index field of file "m" was extracted and a target entry having entry key "k" was located. The block indicator " " and entry address 0007 of the target entry were saved as "BI" and "ADD", respectively. Then, the block indicator and the entry address of the target entry were reset to " " and 0008 respectively, so as to form a Y level block, Y for file "p".

Next, the tape was moved to the position indicated by "ADD" (0007) and the Z level block indicated by "BI", in this case the Z block at tape position 0007, was extracted. Since this was a final leaf level block, a new entry having entry key "p", block indicator " " and entry address 0008 was inserted into the extracted Z block after the target entry, the entry having entry key "n", so as to form a Z level block for file "p".

Since the Z level block now had four entries, a block split operation was performed as follows. The Z level block was split into two Z level blocks, Z and Z. The first two entries of the original Z level block remained in the Z block and the last two entries of the original Z level block were copied into the Z block. Then, since the Y level block, Y already existed, an entry referring to the first entry key in the Z block was added to the Y level block. The entry had entry key "n", block indicator "" and entry address 0008. Since this operation exceeded the maximum size of the block, a further block split had to be performed, this time on the Y a block as follows.

First, the Y block was split into two Y level blocks, Y and Y. The first two entries of the original Y block remained in the Y block and the last two entries of the original Y block were moved into the new Y block. Then, an X level block, X, having two entries was created. The first entry of the X block contained entry key "0", block indicator " " and entry address 0008, and the second entry referred to the first entry of the Y block and thus had entry key "n", block indicator "" and entry address 0008. Thus, a three level index field including one X level block, X, two Y level blocks, Y and Y, and two Z level blocks, Z and Z for file "p" was created. A filemark, the index field and the data were written to tape at position 0008.

FIG. 3j illustrates the portion of a tape containing the index field of a file having a UPK of "y" added to the tape at tape position 0009 immediately following the data for file "p". To create that index field, the X level block of file "p" was copied into memory, the block indicator, and entry address, 0008, of the target entry were saved to memory as "BI" and "ADD", respectively, and then, the block indicator and the entry address of the target entry were reset to and 0009, respectively, so as to form an X level block, X for file "y".

Next, the tape was moved to the position indicated by "ADD" (0008) and the Y level block indicated by "BI" ( ) in this case the Y block of tape position 0008, was read. In this block, the entry having entry key "s" was the target entry. The block indicator " " and entry address 0004 of the target entry were saved as "BI" and "ADD", respectively, and the block indicator and the entry address of the target entry were reset to " " and 0009, respectively, so as to form a Y level block, Y for file "y".

Next, the tape was moved to the position indicated by "ADD" (0004) and the Z level block indicated by "BI" ( ) in this case the Z block of tape position 0004, was copied into memory. Since this was a final leaf level, a new entry having entry key "y", block indicator " " and entry address 0009 were inserted into the extracted Z block after the target entry which had entry key "t", so as to form a Z level block, Z for file "y". Thus, a three level index field having one X level block X one Y level block Y and one Z level block Z for file "y" was created. A filemark, the index field just described and the data for file "m" were stored to the tape at position 0009.

An example of the method of retrieving a file written on the tape will now be described. This process was used many times in the previous discussion. Assume it is desired to retrieve file "p". The first step is to locate the index field for the last file on the tape, retrieve the lowest level block in the index field of that file, and locate the appropriate target entry in that block. The last file on the tape is file "y", the lowest level block is the X block, the target entry is the entry having entry key "n", which has block indicator " " and entry address 0009. Then, the tape is moved to the position corresponding to the entry address of the target entry in the X block, position 0009 and the block specified by the block indicator of the target entry of the next higher block, Y, is copied into memory and the target entry in that block is located. The target entry is the entry having entry key "n", block indicator " " and entry address 0008.

The tape is moved to the position specified by the entry address of the target entry in the Y block, and the appropriate block at the next higher level is retrieved. Since the block indicator was and the next higher block level is Z, the Z block at tape position 0008 is retrieved. The target entry of the extracted Z block is located. This is the entry having entry key "p", block indicator " " and entry address 0008. Since this is the final leaf level, the entry key of the target entry of the Z block is compared with the entry key of the desired file. As these two entry keys match, the entry address of the target entry indicates the location of the desired file "p". Accordingly, the tape is moved to tape position 0008 and file "p" is retrieved.

Assume it is desired to locate file "c". First, the X block of the last file "y" is retrieved to memory. The target entry in this block is the entry having entry key "0", block indicator " " and entry address 0008. In accordance with this target entry, the Y block at tape position 0008 is retrieved. The target entry of this block is the entry having entry key "0", block indicator and entry address 0006 referring to the Z block at tape position 0006. The target entry of this block is the entry having entry key "a", block indicator and entry address 0001. Since this is the final leaf level, the entry key of the target entry is compared with the entry key of the desired file. In this case, these two entry keys do not match, it is determined that there is no file "c" written on the tape.

The above-described embodiments of the invention are intended to be examples of the present invention and numerous modifications, variations, and adaptations may be made to the particular embodiments of the invention without departing from the scope and spirit of the invention, which is defined in the claims.

What is claimed is:

1. A method of retrievably storing indexed data on a sequential data storage medium, the data indexed according to a predetermined order, comprising the steps of:
    storing a data file on the sequential storage medium;
    identifying the presence of a last written index portion indexing the last previously written data on the sequential data storage medium including reference to locations of other previous index portions comprising portions of an index range according to the predetermined order;
    determining an index position for index data relating to the stored data file within the identified last written index portion according to the predetermined order;
    for any of the identified previous index portions, determining if the addition of the index data relating to the stored data file results in a change to any of the index portions or if the index portions are unchanged;
    storing an index within an index field of the stored data file on the sequential storage medium including:
        references to the location of any index portion that are determined to remain unchanged; and
        index portions that are changed to include the index data relating to the stored data file according to the predetermined order.

2. A method of retrievably storing indexed data as defined in claim 1, wherein the last written index portion includes reference to locations of index portions comprising portions of an index range according to the predetermined order.

3. A method of retrievably storing indexed data as defined in claim 2, wherein an index portion includes up to a predetermined plurality of entries within the portion of the index range.

4. A method of retrievably storing indexed data as defined in claim 3, wherein an index portion is changed, to add a new entry, or when the predetermined plurality of entries is exceeded to redefine the portion of the index range comprising an index portion.

5. A method of retrievably storing indexed data as defined in claim 4, wherein the index portions are stored in a hierarchical structure of blocks, including at least one final leaf level block, each entry in each said final leaf level block containing the actual address of a data file.

6. A method of retrievable storing encoded data files on a sequential storage medium, comprising the steps of:
    a) locating a last file stored on the medium;
    b) duplicating first indexing data of the last file stored on the medium, the first indexing data comprising a start position of a sequence of one or more other files;
    c) compiling second indexing data for a new data file having a primary key and a start position of the new file on the medium;
    d) modifying the duplicate of the first indexing data to include the second indexing data of the new data file;
    e) inserting the modified duplicate of the indexing data in the new data file; and
    f) storing the new data file sequentially on the medium following the last file stored.

7. A method of retrievably storing encoded data files as defined in claim 6, further including the step of sorting the entries by entry key prior to inserting the modified duplicate of the indexing data in the new data file.

8. A method of retrievably storing encoded data files as defined in claim 6, wherein the indexing data of the last file stored on the medium comprises:
    a start position of a sequence of one or more of other files, including indexing data, leading in one direction from a current position on the medium toward one end of the medium, the indexing data including:
        one or more blocks arranged in a hierarchy for storing indexing data, each block including:
            a block level indicator;
            an entry field for storing a plurality of entries including the other start positions, each entry including:
                an entry key; a block indicator for storing the identity of an associated higher level of block in the one or more blocks; and an entry address indicating the position on the medium of at least one of the other start positions; and,
            an end of block indicator.

9. A method for locating a data file stored on a sequential recording medium having a specific entry key, absent an index for the data file stored in operating memory said method comprising steps of:
    a) locating a last data file written on the medium, the last file having an adjacent indexing data field;
    b) reading an indexing data field of the last file, said indexing data field having at least one block ordered in a hierarchy of block levels, each block including a block level indicator and an entry field for storing a start position of a sequence of one or more other data files;
    c) extracting a lowest level block and finding an indication of an immediately higher level block having information relating to the data file by comparison of the specific entry key of the data file with information contained in the lowest level block;
    d) moving to a position on the medium of a data file having the immediately higher level block;

e) reading an index field adjacent the data file and extracting from the immediately higher level block a indication of a further immediately higher level block having information relating to the data file by comparison the specific entry key of the data file with information contained in the immediately higher level block;

f) repeating the steps (d) and (e) until a final leaf level block is extracted;

g) moving to a data file position having the data file indicated by information contained in the final leaf level block.

10. A sequential recording medium for retrievably storing a plurality of data files, each data file indexed according to a predetermined order, each data file comprising;

a start field for marking the start of a data file;

an index field for storing indexing data respecting the associated data file, and for. storing a sequence of one or more positions of other start fields respecting other data files leading in reverse direction on from a current position on the medium toward the beginning of said medium; and, a data field for storage data which forms said data file, wherein the index field identifies an ordered range of data files stored on the medium, and locations of previous index files on the medium containing additional portions of the ordered range.

11. A sequential recording medium as defined in claim 10, wherein the sequential recording medium is optical tape and each file is stored adjacent a previous file.

12. A sequential recording medium as defined in claim 10, where the associated index field comprises one or more hierarchically structured blocks of indexing data, each said block including:

an indexing level indicator in accordance with the defined indexing hierarchy;

an entry field for storing up to a determined plurality of entries indicative of the positions of other start fields; and an end of block indicator field.

13. A sequential recording medium as defined in claim 12, wherein the defined indexing hierarchy in each said index field includes at least one final leaf level block, each entry in each said final leaf level block containing the address of a data file.

14. A sequential recording medium as defined in claim 13, wherein the defined indexing hierarchy further includes one or more subsidiary levels each having one or more indexing blocks, each said block in said subsidiary levels including an entry corresponding to at least one block in a next higher level.

15. An apparatus for retrieving a data file stored on a sequential recording medium, the data file indexed according to a predetermined order, absent a separate index for the data file, the apparatus comprising:

a data reader for reading data from a current location on the storage medium;

a mechanism for varying the current location; and a processor for controlling the mechanism and the data reader and for receiving data from the data reader, the processor comprising:

means for locating a current index field adjacent a current data file stored on the medium and for controlling the data reader to read the current index field and provide the read data to the processor, means for traversing a tree branch determined from the provided current index field, the tree branch having at least an additional index field forming a leaf level storing a location of the file on the storage medium, the additional index field stored at another location on the storage medium adjacent another data file, and means for controlling the mechanism to move the storage medium to the location of the file and for controlling the data reader to retrieve the file therefrom.

16. An apparatus as defined in claim 5 wherein the means for traversing a tree branch comprises means for reading successive index portions and determining from each successive index portion either a next index portion location or the location of the file.

* * * * *